(12) United States Patent
Berezecki

(10) Patent No.: US 11,277,322 B2
(45) Date of Patent: *Mar. 15, 2022

(54) NETWORK-TRAFFIC-ANALYSIS-BASED SUGGESTION GENERATION

(71) Applicant: Meta Platforms, Inc., Menlo Park, CA (US)

(72) Inventor: Mateusz Berezecki, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,971

(22) Filed: Sep. 9, 2020

(65) Prior Publication Data
US 2020/0412626 A1    Dec. 31, 2020

Related U.S. Application Data

(63) Continuation of application No. 16/508,098, filed on Jul. 10, 2019, now Pat. No. 10,826,804, which is a
(Continued)

(51) Int. Cl.
*H04L 12/26* (2006.01)
*H04L 29/12* (2006.01)
(Continued)

(52) U.S. Cl.
CPC .......... *H04L 43/062* (2013.01); *G06Q 10/06* (2013.01); *G06Q 50/01* (2013.01); *H04L 43/08* (2013.01);
(Continued)

(58) Field of Classification Search
CPC ...... G06Q 10/06; G06Q 50/01; H04L 43/062; H04L 43/08; H04L 61/103; H04L 61/1511; H04L 61/6022
See application file for complete search history.

(56) References Cited

U.S. PATENT DOCUMENTS 5,835,061 A * 11/1998 Stewart .............. G06Q 30/0254
                                                                342/457
6,414,635 B1 * 7/2002 Stewart .................. G01S 13/74
                                                                342/457
(Continued)

FOREIGN PATENT DOCUMENTS

WO    WO-2010043241 A1 *  4/2010   ............ H04W 48/18

OTHER PUBLICATIONS

Robert Fabricant. "FourSquare and the Future of Direct(ed) Messaging", frogdesign.com, Mar. 16, 2009, 4 pages. (Year: 2009).*
(Continued)

*Primary Examiner* — George C Neurauter, Jr.
(74) *Attorney, Agent, or Firm* — Baker Botts L.L.P.

(57) ABSTRACT

A method involves receiving a request for information of one or more second users located within a vicinity of a first client device, determining, for each second user within the vicinity of the first client device, an affinity score between a first user and the second user based at least on one or more network-traffic patterns associated with the first client device and a second client device associated with the second user, selecting one or more of the second users within the vicinity of the first client device based on the determined affinity scores, and sending, to the first client device, information associated with the selected one or more second users, the information including one or more context items generated based on the network-traffic patterns associated with the first client device and the one or more second client devices associated with the selected one or more second users.

20 Claims, 6 Drawing Sheets

Related U.S. Application Data continuation of application No. 14/727,454, filed on Jun. 1, 2015, now Pat. No. 10,397,075, which is a continuation of application No. 13/301,290, filed on Nov. 21, 2011, now Pat. No. 9,058,573.

(51) Int. Cl.
| | |
|---|---|
| *G06Q 50/00* | (2012.01) |
| *G06Q 10/06* | (2012.01) |
| *H04L 43/062* | (2022.01) |
| *H04L 43/08* | (2022.01) |
| *H04L 61/4511* | (2022.01) |
| *H04L 101/622* | (2022.01) |
| *H04L 61/103* | (2022.01) |

(52) U.S. Cl.
CPC ...... *H04L 61/1511* (2013.01); *H04L 61/6022* (2013.01); *H04L 61/103* (2013.01)

(56) References Cited

U.S. PATENT DOCUMENTS

| | | | | |
|---|---|---|---|---|
| 6,618,593 | B1* | 9/2003 | Drutman | H04L 67/18 455/456.3 |
| 7,035,618 | B2* | 4/2006 | Schnurr | H04W 4/029 455/404.2 |
| 7,310,676 | B2* | 12/2007 | Bourne | H04L 51/32 455/414.1 |
| 7,423,580 | B2* | 9/2008 | Markhovsky | G01S 13/87 340/539.13 |
| 7,787,886 | B2* | 8/2010 | Markhovsky | G01S 5/0294 455/456.1 |
| 7,970,912 | B2* | 6/2011 | Bourne | H04W 99/00 709/227 |
| 8,134,560 | B2* | 3/2012 | Bates | G06Q 30/02 345/474 |
| 8,392,500 | B2* | 3/2013 | Macwan | H04W 4/14 709/203 |
| 8,417,780 | B2* | 4/2013 | Jennings | H04L 67/24 709/204 |
| 8,594,715 | B1* | 11/2013 | Stewart | H04L 67/18 455/518 |
| 8,682,342 | B2* | 3/2014 | Lin | H04L 67/18 455/456.1 |
| 8,743,144 | B2* | 6/2014 | Takeshita | G06Q 10/109 345/632 |
| 8,880,583 | B2* | 11/2014 | Mitnick | G06F 16/29 709/203 |
| 8,924,479 | B2* | 12/2014 | Jennings | H04W 4/02 709/204 |
| 8,930,385 | B2* | 1/2015 | Poltorak | G06Q 30/00 707/758 |
| 9,058,573 | B2* | 6/2015 | Berezecki | G06Q 10/06 |
| 9,237,199 | B2* | 1/2016 | Jennings | H04L 67/18 |
| 9,396,498 | B1* | 7/2016 | Zhu | H04L 51/32 |
| 9,413,832 | B2* | 8/2016 | Macwan | G06Q 30/02 |
| 9,485,313 | B2* | 11/2016 | Poltorak | G06F 16/288 |
| 9,639,901 | B2* | 5/2017 | Montoya | H04W 4/023 |
| 9,838,484 | B2* | 12/2017 | Poltorak | G06Q 30/00 |
| 9,886,495 | B2* | 2/2018 | Poltorak | H04W 4/21 |
| 9,894,172 | B2* | 2/2018 | Macwan | H04L 51/04 |
| 9,945,680 | B1* | 4/2018 | Kahn | G06Q 10/1095 |
| 10,114,901 | B2* | 10/2018 | Mitrovic | G06F 16/9535 |
| 10,198,775 | B2* | 2/2019 | Lobb | G06Q 50/01 |
| 10,397,075 | B2* | 8/2019 | Berezecki | H04L 43/08 |
| 10,546,353 | B2* | 1/2020 | Montoya | H04W 4/029 |
| 10,776,403 | B2* | 9/2020 | Poltorak | H04W 4/21 |
| 10,826,804 | B2* | 11/2020 | Berezecki | G06Q 50/01 |
| 11,122,536 | B2* | 9/2021 | Burrell | H04W 4/023 |
| 2002/0173981 | A1* | 11/2002 | Stewart | G06Q 30/0239 705/1.1 |
| 2006/0046743 | A1* | 3/2006 | Mirho | H04L 67/18 455/456.3 |
| 2006/0167991 | A1* | 7/2006 | Heikes | H04L 51/04 709/204 |
| 2007/0005419 | A1* | 1/2007 | Horvitz | G06Q 30/02 701/533 |
| 2007/0075898 | A1* | 4/2007 | Markhovsky | H04W 4/027 342/386 |
| 2007/0156664 | A1* | 7/2007 | Norton | A63F 13/798 |
| 2007/0167136 | A1* | 7/2007 | Groth | H04W 8/005 455/41.2 |
| 2007/0282621 | A1* | 12/2007 | Altman | G06Q 50/10 705/319 |
| 2008/0014964 | A1* | 1/2008 | Sudit | H04L 67/18 455/456.1 |
| 2008/0188261 | A1* | 8/2008 | Arnone | H04W 4/02 455/550.1 |
| 2009/0215469 | A1* | 8/2009 | Fisher | H04W 4/029 455/456.3 |
| 2009/0247191 | A1* | 10/2009 | Sennett | H04W 4/029 455/456.3 |
| 2009/0319288 | A1* | 12/2009 | Slaney | G06Q 10/10 705/1.1 |
| 2010/0056183 | A1* | 3/2010 | Oh | H04L 12/189 455/456.3 |
| 2010/0159945 | A1* | 6/2010 | Brisebois | H04W 4/02 455/456.1 |
| 2010/0197318 | A1* | 8/2010 | Petersen | G06Q 30/02 455/456.1 |
| 2010/0197319 | A1* | 8/2010 | Petersen | H04W 4/021 455/456.1 |
| 2010/0198826 | A1* | 8/2010 | Petersen | H04L 67/22 707/737 |
| 2010/0198828 | A1* | 8/2010 | Petersen | G06Q 10/10 707/739 |
| 2010/0198862 | A1* | 8/2010 | Jennings | H04L 67/24 707/769 |
| 2010/0198870 | A1* | 8/2010 | Petersen | H04L 67/24 707/780 |
| 2010/0198917 | A1* | 8/2010 | Petersen | H04L 67/22 709/204 |
| 2011/0047471 | A1* | 2/2011 | Lord | H04W 4/02 715/739 |
| 2011/0072071 | A1* | 3/2011 | Macwan | H04L 51/32 709/203 |
| 2011/0106719 | A1* | 5/2011 | Wang | H04L 67/18 705/319 |
| 2011/0173198 | A1* | 7/2011 | Malleshaiah | G06F 16/337 707/737 |
| 2012/0066306 | A1* | 3/2012 | Leacock | H04L 67/24 709/204 |
| 2012/0066316 | A1* | 3/2012 | Petersen | G06F 16/9537 709/206 |
| 2013/0060635 | A1* | 3/2013 | Walker | H04W 4/21 705/14.58 |
| 2013/0066986 | A1* | 3/2013 | DiCosola | G06Q 50/01 709/206 |
| 2013/0073422 | A1* | 3/2013 | Moore | G06Q 30/02 705/26.7 |
| 2013/0132484 | A1* | 5/2013 | Berezecki | H04L 61/6022 709/205 |

OTHER PUBLICATIONS

FourSquare.com. "FourSquare Blog", posts from Mar. 2009 until Nov. 2011, archived on archive.org on Nov. 20, 2011, 175 pages. (Year: 2001).*

* cited by examiner

| TIME | SRC_IP | SRC_MAC | Dest_IP | Dest_MAC | TYPE | DEVICE | SSID | GPS |
|---|---|---|---|---|---|---|---|---|
| 08/01/11 14:23:04 | 192.168.0.104 | 00:e0:81:01:ad:4d | 192.168.0.101 | ff:ff:ff:ff:ff:ff | ARP REQUEST | | SSID_Name | XX, YY |
| 08/01/11 14:23:04 | 192.168.0.1 | 00:e1:aa:f3:bc:11 | 192.168.0.104 | 00:e0:81:01:ad:4d | ARP RESPONSE | | SSID_Name | XX, YY |
| 08/01/11 14:23:05 | 192.168.0.100 | 00:e3:79:ff:ba:01 | 192.168.0.1 | 00:e1:aa:f3:bc:11 | https | | | |
| 08/01/11 14:23:05 | 192.168.0.101 | 00:a1:b3:f3:aa:12 | BROADCAST | ff:ff:ff:ff:ff:ff | mDNS | FBID 309848 | SSID_Name | XX, YY |

*FIG. 3*

| TIME | DURATION | MAC | DEVICE | NETWORK |
|---|---|---|---|---|
| 08/01/11 14:23:04 | 2 HOURS, 44 MIN | 00:e1:aa:f3:bc:11 | NETGEAR ROUTER | UID: 102943829043 |
| 08/01/11 14:23:04 | 1 HOUR, 6 MIN | 00:a1:b3:f3:aa:12 | FBID: 309848 | UID: 102943829043 |
| 08/01/11 14:23:05 | 2 HOURS, 44 MIN | 12:33:44:ff:bc:aa | CANON PRINTER | UID: 102943829043 |
| 08/01/11 14:23:05 | 1 HOUR, 58 MIN | 00:e3:79:ff:ba:01 | | UID: 102943829043 |
| | | | | |
| | | | | |
| | | | | |

*FIG. 4*

NETWORK-TRAFFIC-ANALYSIS-BASED SUGGESTION GENERATION

PRIORITY

This application is a continuation under 35 U.S.C. § 120 of U.S. patent application Ser. No. 16/508,098, filed 10 Jul. 2019, which is a continuation under 35 U.S.C. § 120 of U.S. patent application Ser. No. 14/727,454, filed 1 Jun. 2015, which is a continuation under 35 U.S.C. § 120 of U.S. patent application Ser. No. 13/301,290, filed 21 Nov. 2011.

TECHNICAL FIELD

The present disclosure relates generally to social networking.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may generate a webpage, or a newsfeed, for a particular user, comprising the recent activities of the user's first-degree connections on the social network. Users utilizing mobile devices having data connections to the social networking system may upload photos or perform actions remotely that appear on his or her news feed when the content is completely uploaded to the social networking system

SUMMARY

Particular embodiments relate to a social networking application resident on a client device that monitors and logs local area network traffic, such as layer 2 configuration protocol messages, in order to determine what other devices, and therefore the users associated with the devices, are commonly encountered on the network. In particular embodiments, client or server-side processing may identify patterns of exposure to a particular user/device, and the social networking system may generate and push suggestions to the owners of the devices to interact on the social networking system. In particular embodiments, the client may employ a beacon-type multicast protocol explicitly including the user's social networking identifier for nearby devices to discover the client. These and other features, aspects, and advantages of the disclosure are described in more detail below in the detailed description and in conjunction with the following figures.

BRIEF DESCRIPTION OF THE DRAWINGS

FIG. 3 illustrates an example log table of local area network traffic.
FIG. 4 illustrates the example log table of FIG. 3 after a preprocessing operation.

DETAILED DESCRIPTION

Figure 1:
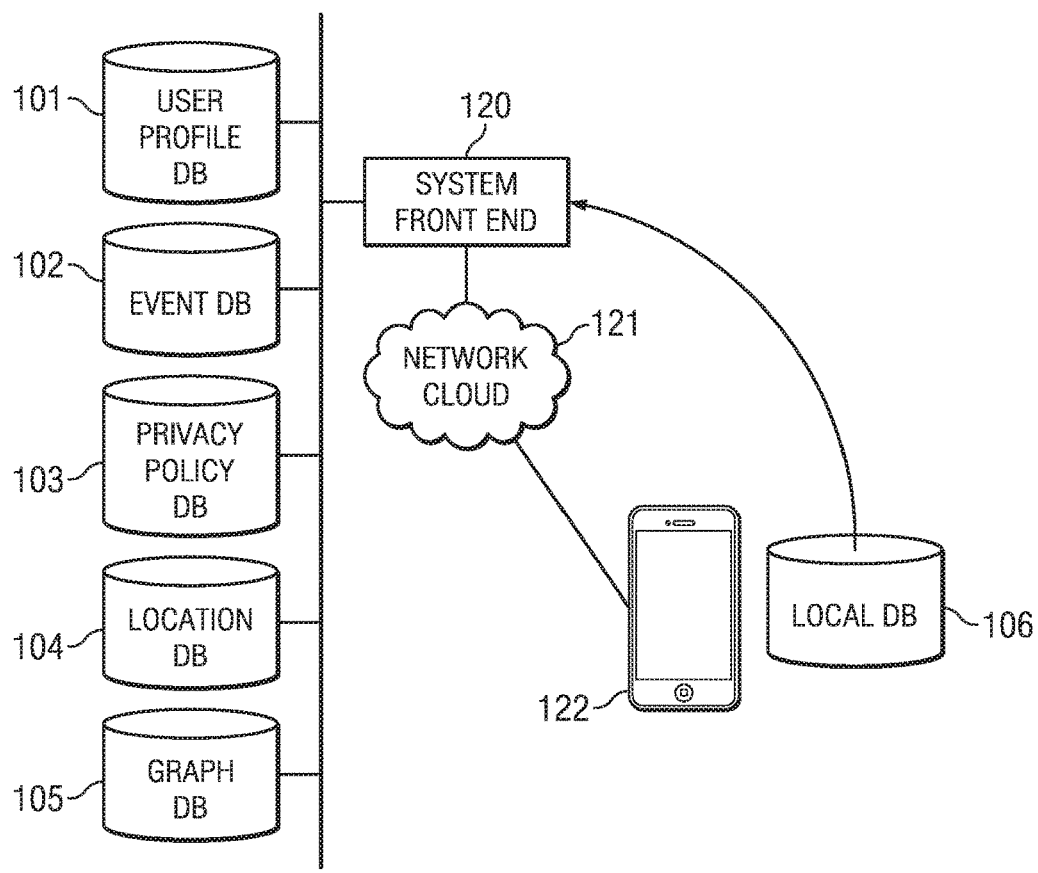
FIG. 1 illustrates an example social networking system.

Social networking systems traditionally allow groups of users to connect on a social networking site after a real-life interaction has occurred. For example, two friends in real life may add a friendship link between their social networking user accounts to share media, content, photos, status updates, and the like. As another example, two users who are introduced at a party may later add each other as friends or professional contacts on the social networking system. However, the use of social networking services has been limited to increasing interaction between two users after some sort of off-network, real-life introduction.

Several social networking applications have attempted to promote social network interaction between strangers, or to make introductions between two strangers based on location or interests. For example, the application HOLLER allows users to join a group (for example, surfers) and the application pushes notifications to the user when other members of the group are within a predetermined distance. As another example, MINGLE users fill out an introduction card and post it to their current location, and may view other users "mingling" at the same location on their mobile device. Similarly, groupchat application SONAR allows users to see profiles for other sonar users who are in the same general vicinity, and initiate instant messaging chats with the users. Applications such as YOBONGO and LOKAST offer similar functionality. However, current location-based social networking offerings all require users to be concurrently geographically collocated to initiate social networking interactions.

Particular embodiments are now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with particular embodiments. The check-in activity may also be displayed on a user profile page and in news feeds provided to users of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, the social networking system may store data representing the relationship between users, objects, and other social graph nodes in a graph database 105.

In particular embodiments, databases 101, 102, 103, 104, and 105 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Front end 120 may also include a newsfeed generator that generates news feeds in response to user requests. In particular embodiments, news feed generator resides on one or more servers separate from front end 120. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place, check in to the place, and upload photos related to the place (in connection with a check-in or at a later time). In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places.

Figure 2:
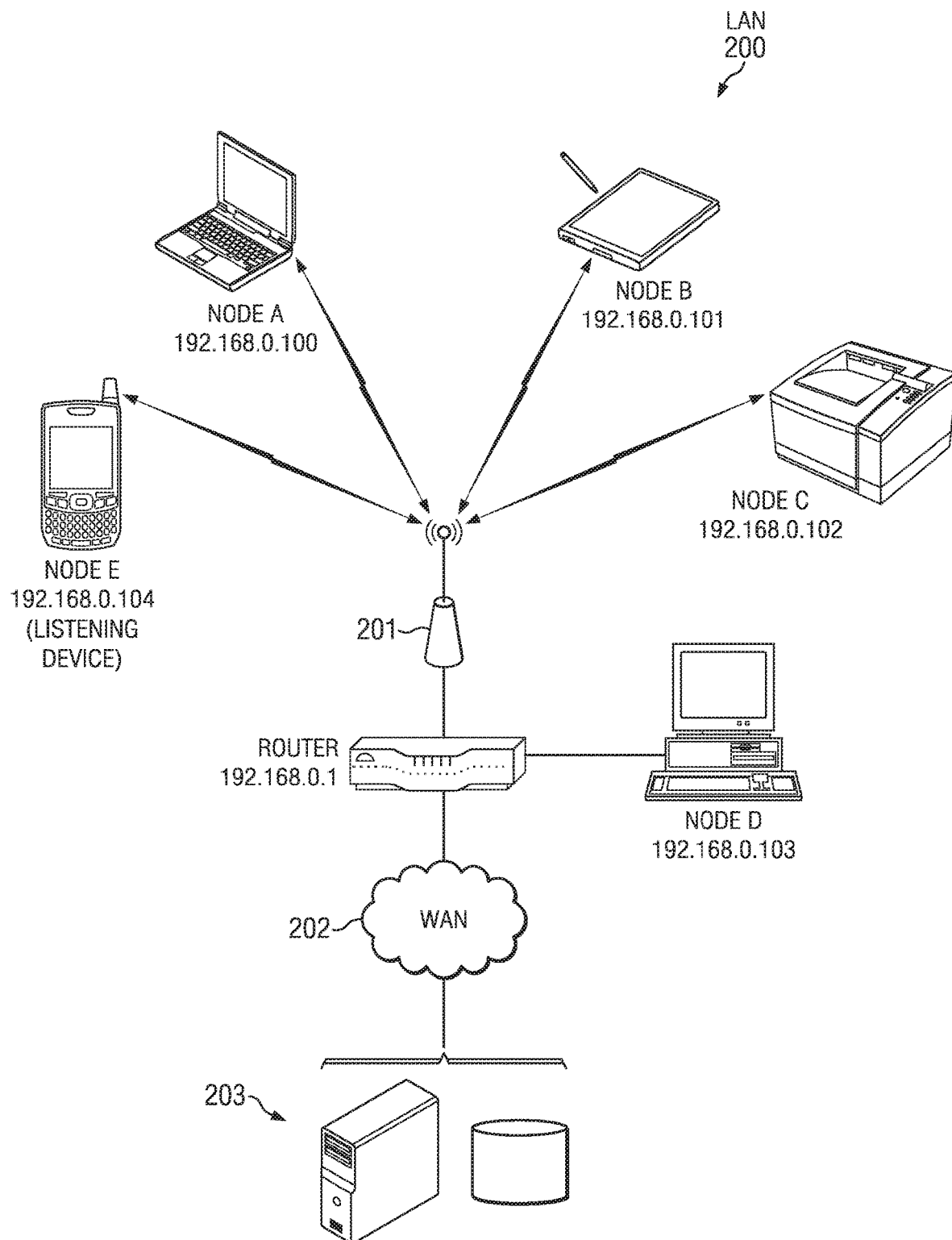
FIG. 2 illustrates an example local area network.

FIG. 2 illustrates an example local area network 200. Local area network 200 may be a wireless network connected by wireless links 201*a*, a wired network connected by wired links 201*b*, or a hybrid of wireless and wired transmission media. Such an example network may exist at any number of public locations, such as a coffeehouse, park, library, mass transit terminal, and the like. LAN 200 may be a wireless network operating in infrastructure mode, as depicted in FIG. 2, or in ad-hoc mode. LAN 200 may utilize any type of link level protocol, including but not limited to IEEE 802.3 Ethernet, ATM, FDDI, X25, and the like. This disclosure contemplates any suitable local area network.

FIG. 2 depicts local area network comprising three four wireless nodes—laptop (node A), tablet pc (node B), smartphone (node E), and a networked printer (node C) connected to a router or default gateway connected to, or integrated with, a wireless access point 201. LAN 200 also includes a wired PC (Node D) connected to the router or default gateway. Nodes A-D obtain their internet connectivity to the wide area network (WAN) 202, and subsequently social networking system 203, through wireless access point 201 and the router/default gateway. The network arrangement and addresses of FIG. 2 are for didactic purposes; this disclosure contemplates any number and arrangement of network devices.

Devices on LAN 200 exchange a number of configuration messages upon initially connecting to LAN 200 through the default gateway. For example, devices connecting to a network utilizing the Internet Protocol (IP) suite must exchange layer 2 address resolution protocol (ARP) messages in order to map their IP address to their unique media access control (MAC) addresses. When a device needs to transmit data to another device on the same network, it knows the source and destination addresses for the data transfer. It must some how map the destination address to a MAC address before forwarding the data. First, the sending station will check its ARP table to see if it has already discovered this destination station's MAC address. If it has not, it will send a broadcast on the network with the destination station's IP address contained in the broadcast. Every station on the LAN receives the broadcast and compares the embedded IP address to its own. Only the station with the matching IP address replies to the sending station with a packet containing the MAC address for the station. When the destination device lies on a remote network, one beyond a router, the process is the same except that the sending station sends the ARP request for the MAC address of the default gateway. It then forwards the information to that device. The default gateway will then forward the information over what ever networks necessary to deliver the packet to the network on which the destination device resides. The router on the destination device's network then users ARP to obtain the MAC of the actual destination device and delivers the packet.

Typically, initial configuration messages are no longer used by applications after all network nodes have obtained their IP addresses and built their ARP tables. However, in many cases, link layer protocol messages continue to be exchanged between nodes on the network. For example, in an 802.11 wireless network, nodes my transmit request to send (RTS) frames and receive CTS frames from wireless access point 201. Other nodes receiving RTS and CTS frames refrain from sending data for a predetermined amount of time to reduce collisions. A listening device, such as node E, may log this traffic as well to build its log table of devices. Although Smartphone (Node E) is designated as the "listening" device in FIG. 2, it should be apparent to one of ordinary skill in the art that any of Nodes A-E may also run a social networking application for logging LAN traffic.

This disclosure contemplates monitoring and logging any type of LAN traffic, including, at the link layer: inverse or reverse ARP (InARP/RARP), neighbor discovery protocol (NDP), open shortest path first (OSPF), layer 2 tunneling protocol (L2TP), point-to-point protocol (PPP), media access control messages and the like. In particular embodiments, the social networking application logs link-layer messages in order to obtain a correspondence between a unique device and its IP address, but continues to log upper layer protocol messages in order to determine whether the device remains connected to the network. For example, once the social networking application determines that a particular IP address corresponds to a particular MAC address, the application may assume that the device is connected to the LAN so long as it notices traffic direct to or from that IP address in the absence of another link layer configuration message mapping the address to a different MAC address.

In particular embodiments, listening nodes may log multicast domain name service (mDNS) LAN traffic. MDNS messages are commonly used as a means of resource discovery without the use of a centralized DNS server. In mDNS, a node searching for a particular host broadcasts an mDNS query message, and the corresponding host replies with a multicast message announcing itself. MDNS is used by resource-discovery protocols such as APPLE's BONJOUR and LINUX AVAHI. In particular embodiments, listening nodes may be programmed to interpret mDNS messages in order to ascertain the type of device or resource broadcast in an announce message, and log the data in its LAN traffic log.

In particular embodiments, devices running a social networking application may be configured to transmit and interpret a specialized social networking mDNS message. For example, listening device node E may connect to LAN 200 and seek to discover if any other members of the social networking system are on the same LAN. In response, other nodes running the social networking application may transmit an mDNS announce message. In particular embodiments, the mDNS announce message may include the announcing node's associated social networking user identification. In particular embodiments, the mDNS announce message may include activities the user is open to engaging in, such as friending, instant messaging chat, voice/video chat, games, sharing music/files/video, sharing links, exchanging contact information, and the like. In particular embodiments, the mDNS announce message may include profile information that the user specifies, such as interests, groups, pages that the user has become a fan of, and the like. In particular embodiments, the mDNS query may contain all or some of the aforementioned social networking information. This disclosure contemplates the inclusion of any social networking information in multicast DNS messages.

FIG. 3 depicts an example table of logged LAN traffic. A listening node (in this example Node C), may, in particular embodiments, log all traffic traversing the LAN into table 300. Table 300 may maintain multiple values for each piece of LAN traffic, including, transmission time 301, source IP address 302, source MAC address 303, destination IP address 304, destination MAC address 305, packet protocol and type 306, device type 307, network SSID 308, and the location of the listening device 309. In particular embodiments, location 309 is determined by GPS triangulation. In particular embodiments, location 309 may be determined by time-distance of arrival (TDoA). In particular embodiments, location 309 may be determined by a database of WIFI networks correlated to geographic location. In particular embodiments, table 300 may log other information, such as the length of a DHCP lease, DNS requests, HTTP requests, FTP transmissions, or any other traffic transmitted across the LAN.

For didactic purposes, table 300 contains four logged transmissions across the LAN. It should be apparent to one of ordinary skill in the art that table 300 may include several thousand transmissions, with the number of transactions increasing dramatically with the number of nodes joining and leaving the network and the connection duration. In particular embodiments, listening nodes, such as Node C, maintain a different table for each LAN. In particular embodiments, listening nodes maintain a single table with a LAN identifier field. This disclosure contemplates any suitable means of storing logged LAN traffic.

Entry 310 of table 300 is an example piece of logged LAN traffic, in this example, and ARP request as indicated by field 306. In this example, node E (the listening device) broadcasts (via transmission to MAC address FF:FF:FF:FF:FF:FF) a request for the MAC address of the default gateway at 192.168.0.1. Almost immediately thereafter, listening node E logs the transmission of 311. In entry 311, the default gateway (at 192.168.0.1) transmits its MAC address in an ARP response back to node E. It should be apparent to one of ordinary skill in the art that multiple intervening transmissions may take place between transmission 308 and 309; such transmissions will be similarly logged and stored in table 300 by node E.

In table entry 312, node E logs an http transmission between Node A and the default gateway. The listening node E may, in particular embodiments, fill in fields 303 and 304 of table 300 via consulting its own ARP tables. As an example in entry 313, listening node E receives and logs an mDNS entry advertising social networking resources from Node B (at 192.168.0.101). Node B broadcasts an mDNS messages as in an mDNS announce message in Bonjour advertising its MAC address 303 and social networking ID 308. Thus, all devices on the LAN that are capable of interpreting mDNS messages of this type; i.e., all devices on the LAN running the social networking application, may communicate with node B on the social network or through the social networking application. If other nodes are also listening nodes, such as node E, listening nodes will store an association between the MAC address of node B and the social networking identifier 307. Thus, listening nodes assume that any traffic they see on the network destined for the MAC address 304 or originating from MAC address 303 for entry 311 indicates that the user associated with the user ID 307 is on the LAN. As previously discussed above, mDNS messages may contain any number of fields containing information from the social networking system.

FIG. 4 illustrates an example table 400 after preprocessing. In particular embodiments, client devices acting as listening nodes perform the preprocessing. In particular embodiments, each listening node transmits its log table to a server, which performs the preprocessing. In particular embodiments, the less processor-intensive steps are performed at the listening node devices, and the processor-intensive steps are performed at the server. This disclosure contemplates any suitable device performing any portion of the preprocessing operation on log table 300.

Table 400 represents the processed log data from table 300. In particular embodiments, table 400 is organized primarily by MAC address, each MAC address in column 403 is associated with a particular device, and for each MAC address 403, table 400 includes a time/date the device was first encountered 401, the duration of the encounter 402, the device type 404, and a network identifier 405. In particular embodiments, the network identifier may be a unique randomly-assigned alphanumeric string for each discrete network. In particular embodiments, the network identifier may be pulled from social networking system 203. For example, if a user of a listening node checks-in to a location on the social network while connected to the LAN available at the checked-in location, the listening node may utilize the location's social networking identifier, or node ID, as the network identifier 405. In particular embodiments, this processing is performed on the back end of social networking system 203. In particular embodiments, social networking system logs every user's IP address, physical location, and MAC address at the time of a check-in for future resolution to build a LAN table.

In particular embodiments, device type 404 may be ascertained by MAC address filtering. For example, it is common for the first three bytes of any MAC address to represent an identifier of the manufacturer of the device. In particular embodiments, the next byte may represent the device type. Thus, by referencing a particular MAC address against a database of manufacturer/device identifiers, the social networking server, or alternatively a listening node itself, may ascertain the type of device and filter table 400 accordingly. For example, in particular embodiments, entries 406 and 408 may be filtered and removed from table 400, because it is unlikely there is a social networking user identifier associated with a router (entry 406) or a printer (entry 408).

Because one object of particular embodiments is to ultimately identify users of the social networking system that a listening node often encounters or spends time with, the only relevant data stored with each unique MAC address is the time and date of the interaction, the duration of the interaction, and, eventually, the social networking user identification associated with the MAC address. Thus, table 400 may store multiple entries for a device even though the social networking UID has never been obtained by the listening device. However, upon upload to a social networking server, if the user of a particular device has ever logged into the social networking system via the device associated with that unique MAC address, the social networking server may fill in column 404 of table 400 with a series of associated social networking identifiers.

Figure 5:
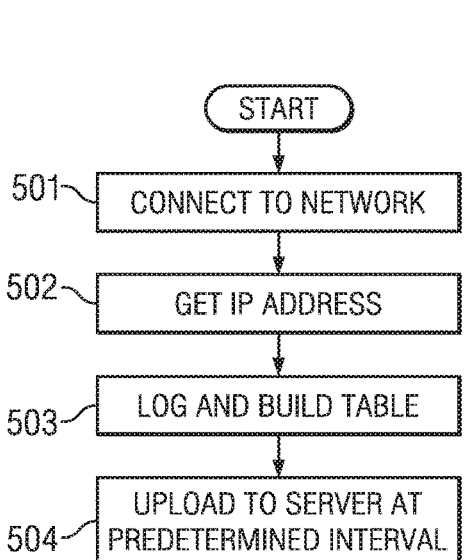
FIG. 5 illustrates an example method for building a network traffic log.

FIG. 5 illustrates an example method of collecting and logging LAN traffic for suggestion generation. At Step 501, a listening node, such as Node E in FIG. 2, connects to the LAN. As part of the connection process, at Step 502, the listening node obtains an IP address via the exchange of various link layer message, such as ARP messages. Methods of obtaining an IP address through DHCP or other protocols for wired or wireless LANs are well-known in the art.

At Step 503, the listening node listens to and logs all LAN traffic. Methods of monitoring LAN traffic are well-known in the art. In particular embodiments, listening nodes log encrypted traffic with only the sender and destination IP address. In particular embodiments, listening nodes drop all encrypted packets. In particular embodiments, listening node logs only packets containing a MAC address, such as ARP/RARP packets. In particular embodiments, listening node logs all packets after a MAC-IP address association has been made for a particular IP address. In particular embodiments, the listening node only logs the most recent packet having the same IP address as a previously associated IP address. For example, listening nodes are primarily only concerned with the duration another node is on the same LAN. After learning that a device (via its MAC address) is connected to the LAN at a particular IP address, there is no need for the listening node to log all traffic to or from that IP address; it is only necessary to log the last transmission from the IP address, or any new MAC address taking the IP address. Thus, in a particular embodiment, a listening node may utilize a buffer of a predetermined size and only enter the most recent transmission from an IP address into table 300. In particular embodiment, listening nodes may only log certain types of traffic. In particular embodiments, listening nodes log any type of resource-sharing mDNS packets. For example, listening nodes may be configured to understand commonly-known or utilized resource-sharing protocols, such as APPLETALK, SAMBA, AVAHI, BONJOUR, and the like. This disclosure contemplates any suitable method of listening to and logging LAN traffic.

For each LAN transmission, listening nodes also assess whether the LAN transmission contains any explicit social networking identifiers. For example, if a node on the network broadcasts an mDNS message containing his or her social networking user identifier, as in transmission 313, listening nodes may display the user interface of FIG. 7 concurrently with adding the logged transmission to table 300.

At Step 504, the listening node uploads the table to the servers of social networking system 203 for analysis. In particular embodiments, the listening nodes upload their LAN traffic logs whenever they disconnect from a particular LAN. In particular embodiments, listening nodes transmit their tables to social networking system 203 at predetermined intervals, such as at the end of every day. In particular embodiments, listening nodes perform preprocessing on their stored LAN traffic tables 300 before transmitting them to social network 203. In such embodiments, listening nodes parse table 300 to determine the overall duration, time of week, and network identification for each unique MAC address. In particular embodiments, listening nodes may perform MAC lookups from a device table to obtain device types as disclosed above.

Figure 6:
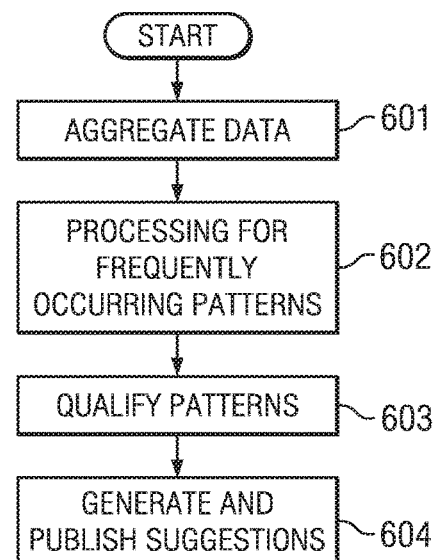
FIG. 6 illustrates a server-side process for generating suggestions based on received log data.

FIG. 6 illustrates an example method of generating social suggestions based on received LAN traffic tables. At Step 601, the servers of social networking system 203 aggregate all the received tables from various users of the social networking system. In particular embodiments, the tables may be sent as raw data, as in table 300, or in preprocessed form, as in table 400. In particular embodiments, social networking system 203 performs any required processing of received tables during the aggregation process to maintain a consistent data set between all uploaded LAN traffic. Social networking system 203 attempts to match a particular user ID with each MAC address in the entire set of uploaded LAN traffic tables through back-end processing. For example, social networking system may log the IP address or MAC address of each user when he or she logs in for the first time from a particular device. In particular embodiments, social networking system requests the MAC address of a device each time a user interacts with the social networking system by posting a comment, "liking" a node, or "checking-in." This disclosure contemplates any suitable server-side or client-side method for associating a MAC address with a particular social networking user identifier.

At Step 602, social networking system 203 performs processing to detect and identify frequently occurring patterns indicating that two devices have spent a large amount of time together. In particular embodiments, social networking system 203 performs association rule learning for all the aggregated log data. In particular embodiments, social networking system 203 performs association rule learning for all log data over a predetermined period of time, such as thirty days. In particular embodiments, social networking system 203 utilizes the fp-growth (Frequent Pattern Growth) algorithm to determine patterns of devices on the same LAN. This disclosure contemplates any suitable method of detecting and identifying patterns of user devices logged into the same local area network.

At Step 603, social networking system 203 qualifies the patterns based on a number of factors. In particular embodiments, social networking system 203 only generates suggestions for patterns that exceed a total aggregate amount of time spent on the same network. For example, the social networking system may qualify a pattern of two users on the same network for three hours every week, but not for a pattern of two users who are on the same network every day for five minutes. In particular embodiments, social networking system 203 qualifies patterns based on the consistency or regularity. For example, randomly spending four hours total together at an airport twice in the last 30 days may not justify generating a suggestion for the two users to add each other on the social network, but connecting to the same public transit WIFI network every day may. In particular embodiments, the social networking system takes into account other social factors in determining whether to generate a suggestion to the user. For example, the social networking system may take into account the users' age group, relationship status, gender, number of mutual friends, interests, and the like. For example, the social networking system is more likely to generate a suggestion for two users who are both single from 20-30 that spend an hour at Starbucks once a week than one of the aforementioned singles a 65-year-old retiree, regardless of the amount of time the retiree's device is seen on the same LAN. This disclosure contemplates any suitable criteria for qualifying detected patterns and determining whether to generate social suggestions based on the qualified patterns.

At Step 604, social networking system generates social suggestions and pushes the suggestions to one or more members identified in the qualified pattern. In particular embodiments, the suggestion is delivered through a notification channel to the users' mobile device. In particular embodiments, the suggestion appears on the right-hand side of his or her profile view. In particular embodiments, the notification is delivered via a text message or email. In particular embodiments, the notification is delivered as an MMS message. In particular embodiments, the notification is delivered as a message on the social networking site. This disclosure contemplates any suitable method of pushing suggestions to one or more users of the social networking system.

Figure 7:
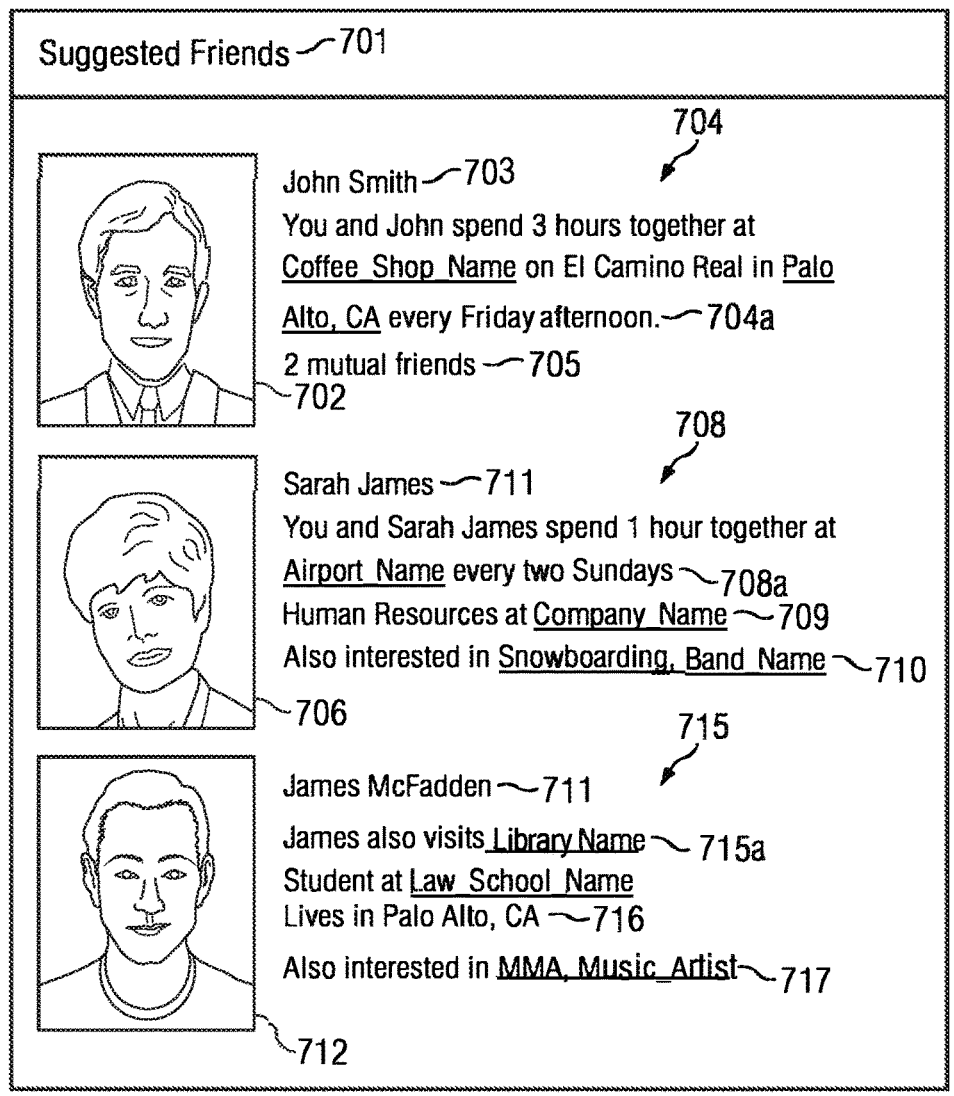
FIGS. 7 and 7A illustrate example user interfaces including generated suggestions.

FIG. 7 illustrates an example set of suggestions 704, 708, and 715 displayed to a user. As previously stated, suggestions 704, 708, and 715 may be displayed on a user's mobile device or anywhere on the user's profile page on the social networking system. In particular embodiments, suggestions 704, 708, and 715 include the users names 703, 707, and 711, and profile pictures 702, 706, and 712. In particular embodiments, the display of personal information to strangers may be controlled by user privacy settings. For example, certain users may opt out of the suggestions feature altogether, so that they will never be suggested to strangers on the same network. As another example, a users' interests, 717 and 710, mutual friends 705, current city 716, and position 709 may only be displayed in a suggestion if the user specifically permits it. In particular embodiments, any piece of social information from a user profile may be displayed in or omitted from a suggestion based on user privacy settings. This disclosure contemplates any suitable manner of managing the display of any piece of social information in a suggestion.

In particular embodiments, suggestions 704, 708, and 715 include suggestion context 704a, 708a, and 715a. Suggestion context is the social networking system's rationale for pushing the suggestion to the user; it is a text description of the qualified patterns that prompted the suggestion generation. For example, suggestion context 704a indicates that the user and John Smith 703 spend 3 hours at the Starbucks in Palo alto every Friday afternoon together, even though they are not friends on the social networking system. Similarly, 708a indicates the user and Sarah James 707 spend an hour together on the airport WIFI network every two Sundays. The user receiving this notification may leverage other elements in the suggestions, such as profile pictures, mutual friends, and mutual interests to use as conversation in a real-life interaction. In particular embodiments, social networking system 203 may push suggestions to two users who have been on the same WIFI network before, but never at the same time, as in suggestion 715. In suggestion 715, the two users both spend a great deal of time at Stanford Law Library, but either never at the same time, or never in a set pattern. In such situations, the social networking system may still push a suggestion to the users, particularly if other factors indicate that the two users would make good friends. For example, if both users are in the same age group, single, of opposite genders, in the same industry, and share the same interests, the social networking system may push a suggestion to the users, despite the fact that they have never actually been on the same network at the same time.

Figure 7A:
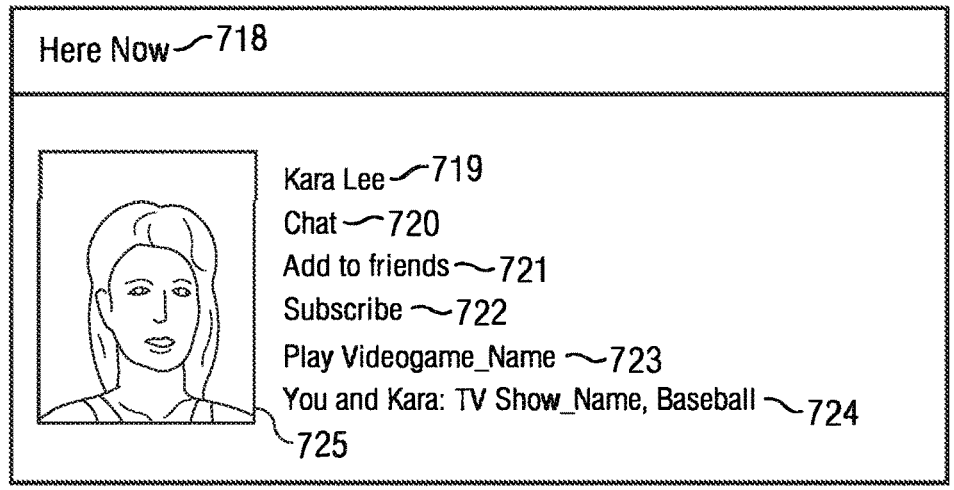

FIG. 7A depicts a sample user interface 718 displayed on a user's mobile device upon receiving a broadcast mDNS message including social networking information. As previously described, in particular embodiments, users may broadcast mDNS messages in a manner similar to other resource-discovery protocols such as BONJOUR, SAMBA, AVAHI, etc. that contains social networking information. In particular embodiments, the social networking information contains the social networking identifier, and the interactions that the user is open to receiving. In particular embodiments, these interactions may be set by a user's privacy settings. In the example of FIG. 7A, the user, Kara Lee 719, has previously indicated that she will allow users to engage her in chat 720, by adding her as a friend 721, by subscribing to her public posts 722, or playing words with friends 723. In particular embodiments, these interactions may be initiated by clicking or otherwise selecting one of the options 720-723. In particular embodiments, common interests or friends 724 may also be displayed in suggestion 718. This disclosure contemplates any suitable user interface for interacting with users connected to the same LAN and broadcasting social networking information.

Figure 8:
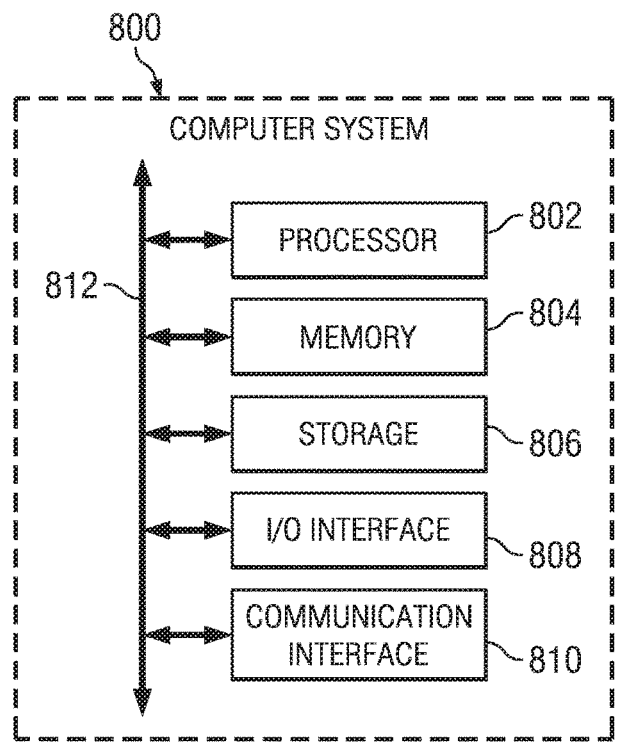
FIG. 8 illustrates an example computing system.

FIG. 8 illustrates an example computer system 800, which may be used with some embodiments. This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. The present disclosure contemplates processor 802 including any suitable number of any suitable internal caches, where appropriate. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. In particular embodiments, one or more memory management units (MMUs) reside between processor 802 and memory 804 and facilitate accesses to memory 804 requested by processor 802. In particular embodiments, memory 804 includes random access memory (RAM). Memory 804 may include one or more memories 802, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 812 may include one or more buses 812, where appropriate. Although this disclosure describes and illustrates a particular bus, this disclosure contemplates any suitable bus or interconnect.

Figure 9:
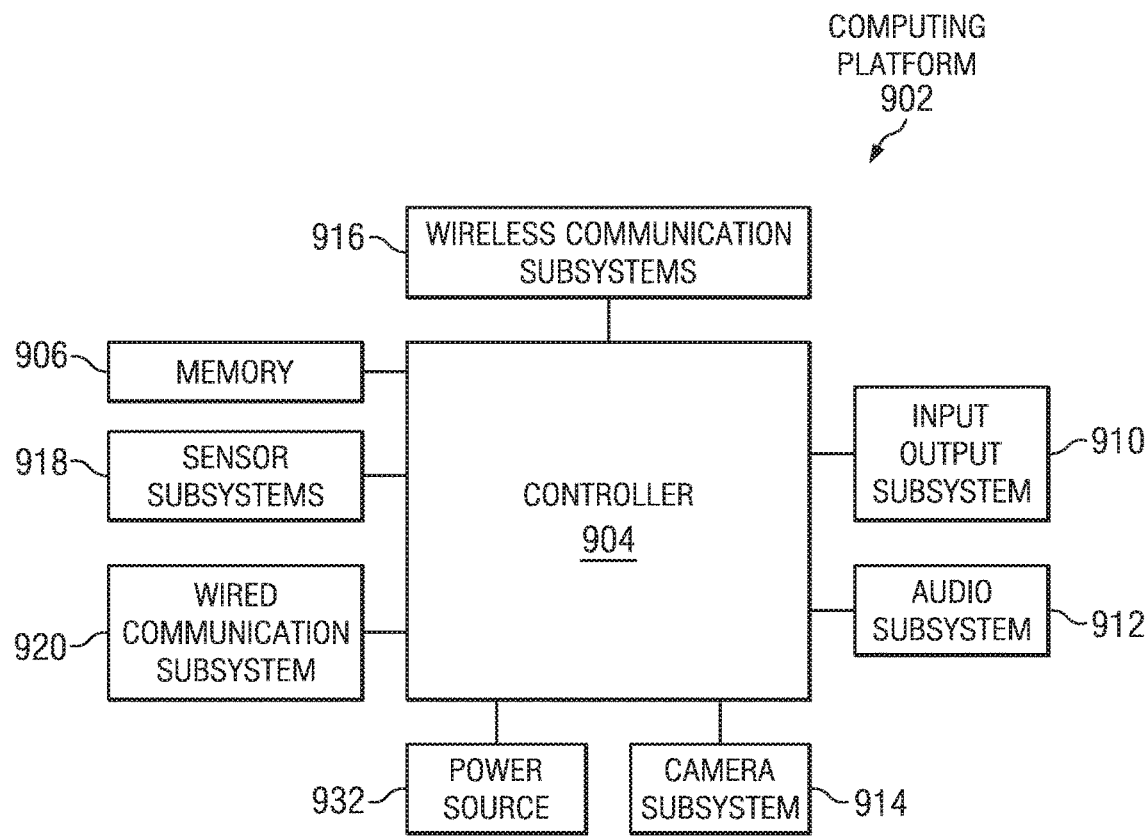
FIG. 9 illustrates an example mobile device.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 9 shows a schematic representation of the main components of an example computing platform of a client or mobile device, according to various particular embodiments. In particular embodiments, computing platform 902 may comprise controller 904, memory 906, and input output subsystem 910. In particular embodiments, controller 904 which may comprise one or more processors and/or one or more microcontrollers configured to execute instructions and to carry out operations associated with a computing platform. In various embodiments, controller 904 may be implemented as a single-chip, multiple chips and/or other electrical components including one or more integrated circuits and printed circuit boards. Controller 904 may optionally contain a cache memory unit for temporary local storage of instructions, data, or computer addresses. By way of example, using instructions retrieved from memory, controller 904 may control the reception and manipulation of input and output data between components of computing platform 902. By way of example, controller 904 may include one or more processors or one or more controllers dedicated for certain processing tasks of computing platform 902, for example, for 2D/3D graphics processing, image processing, or video processing.

Controller 904 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 906 that is operatively coupled to controller 904.

Memory 906 may encompass one or more storage media and generally provide a place to store computer code (e.g., software and/or firmware) and data that are used by computing platform 902. By way of example, memory 906 may include various tangible computer-readable storage media including Read-Only Memory (ROM) and/or Random-Access Memory (RAM). As is well known in the art, ROM acts to transfer data and instructions uni-directionally to controller 904, and RAM is used typically to transfer data and instructions in a bi-directional manner. Memory 906 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 904. Information may also reside on one or more removable storage media loaded into or installed in computing platform 902 when needed. By way of example, any of a number of suitable memory cards (e.g., SD cards) may be loaded into computing platform 902 on a temporary or permanent basis.

Input output subsystem 910 may comprise one or more input and output devices operably connected to controller 904. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 902. The display is generally configured to display a graphical user interface (GUI) that provides an easy to use visual interface between a user of the computing platform 902 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 910 may also include touch based devices such as touch pad and touch screen. A touchpad is an input device including a surface that detects touch-based inputs of users. Similarly, a touch screen is a display that detects the presence and location of user touch inputs. Input output system 910 may also include dual touch or multi-touch displays or touch pads that can identify the presence, location and movement of more than one touch inputs, such as two or three finger touches.

In particular embodiments, computing platform 902 may additionally comprise audio subsystem 912, camera subsystem 912, wireless communication subsystem 916, sensor subsystems 918, and/or wired communication subsystem 920, operably connected to controller 904 to facilitate various functions of computing platform 902. For example, Audio subsystem 912, including a speaker, a microphone, and a codec module configured to process audio signals, can be utilized to facilitate voice-enabled functions, such as voice recognition, voice replication, digital recording, and telephony functions. For example, camera subsystem 912, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 920 can include a Universal Serial Bus (USB) port for file transferring, or a Ethernet port for connection to a local area network (LAN).

Wireless communication subsystem 916 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 916 may include hosting protocols such that computing platform 902 may be configured as a base station for other wireless devices.

Sensor subsystem 918 may include one or more sensor devices to provide additional input and facilitate multiple functionalities of computing platform 902. For example, sensor subsystems 918 may include GPS sensor for location positioning, altimeter for altitude positioning, motion sensor for determining orientation of a mobile device, light sensor for photographing function with camera subsystem 914, temperature sensor for measuring ambient temperature, and/or biometric sensor for security application (e.g., fingerprint reader).

In particular embodiments, various components of computing platform 902 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I2C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Additionally, computing platform 902 may be powered by power source 932.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computer servers:
    receiving first network-traffic data from a local area network, wherein the first network-traffic data is associated with a first connection between a first client device associated with a first user and the local area network;
    receiving second network-traffic data from the local area network, wherein the second network-traffic data is associated with a second connection between a second client device associated with a second user and the local area network;
    determining a contemporaneous connection to the local area network by both the first client device and the second client device based on a qualified network-traffic pattern of the first network-traffic data and the second network-traffic data, wherein the qualified network-traffic pattern is qualified based on the first connection and the second connection occurring during a same time period;
    determining one or more social factors between the first user and the second user;
    generating one or more suggestions for the first user based on the one or more social factors, the one or more suggestions comprising one or more context items that indicates the contemporaneous connection to the local area network by both the first client device and the second client device; and
    sending, to the first client device, instructions for presenting one or more of the generated suggestions.

2. The method of claim 1, wherein determining the one or more social factors between the first user and the second user is based on social networking information associated with the first user or the second user.

3. The method of claim 1, wherein the qualified network-traffic pattern is qualified further based on a duration of the same time period during which the first client device and the second client device have been contemporaneously connected to of the local area network.

4. The method of claim 1, wherein the qualified network-traffic pattern is qualified further based on social networking information associated with the first user and the second user.

5. The method of claim 1, wherein the one or more context items include information indicating a duration of the same time period during which the first client device and the second client device have been contemporaneously connected to of the local area network.

6. The method of claim 1, further comprising determining that the first client device and the second client device are located at a geographic location.

7. The method of claim 6, wherein determining that the first client device and the second client device are located at the geographic location comprises:
    determining that the first client device and the second client device are connected to a local area network corresponding to the geographic location.

8. The method of claim 6, wherein determining that the first client device and the second client device are located at the geographic location is based on cell tower triangulation, Wi-Fi positioning, or global position system (GPS) positioning.

9. The method of claim 6, wherein the instructions for presenting one or more of the generated suggestions are sent to the first client device subsequent to determining that the first client device and the second client device are located at the geographic location.

10. One or more computer-readable non-transitory storage media embodying software that is operable when executed to:
    receive first network-traffic data from a local area network, wherein the first network-traffic data is associated with a first connection between a first client device associated with a first user and the local area network;
    receive second network-traffic data from the local area network, wherein the second network-traffic data is associated with a second connection between a second client device associated with a second user and the local area network;
    determine a contemporaneous connection to the local area network by both the first client device and the second client device based on a qualified network-traffic pattern of the first network-traffic data and the second network-traffic data, wherein the qualified network-traffic pattern is qualified based on the first connection and the second connection occurring during a same time period;
    determine one or more social factors between the first user and the second user;
    generate one or more suggestions for the first user based on the one or more social factors, the one or more suggestions comprising one or more context items that indicates the contemporaneous connection to the local area network by both the first client device and the second client device; and
    send, to the first client device, instructions for presenting one or more of the generated suggestions.

11. The one or more computer-readable non-transitory storage media of claim 10, wherein determining the one or more social factors between the first user and the second user is based on social networking information associated with the first user and the second user.

12. The one or more computer-readable non-transitory storage media of claim 10, wherein the qualified network-traffic pattern is qualified further based on a duration of the same time period during which the first client device and the second client device have been contemporaneously connected to the local area network.

13. The one or more computer-readable non-transitory storage media of claim 10, wherein the qualified network-traffic pattern is qualified further based on social networking information associated with the first user and the second user.

14. The one or more computer-readable non-transitory storage media of claim 10, wherein the software is further operable when executed to:
 determine that the first client device and the second client device are located at a geographic location.

15. The one or more computer-readable non-transitory storage media of claim 14, wherein determining that the first client device and the second client device are located at the geographic location is based on cell tower triangulation, Wi-Fi positioning, or global position system (GPS) positioning.

16. A system comprising one or more processors and a memory coupled to the processors comprising instructions executable by the processors, the processors being operable when executing the instructions to:
 receive first network-traffic data from a local area network, wherein the first network-traffic data is associated with a first connection between a first client device associated with a first user and the local area network;
 receive second network-traffic data from the local area network, wherein the second network-traffic data is associated with a second connection between a second client device associated with a second user and the local area network;
 determine a contemporaneous connection to the local area network by both the first client device and the second client device based on a qualified network-traffic pattern of the first network-traffic data and the second network-traffic data, wherein the qualified network-traffic pattern is qualified based on the first connection and the second connection occurring during a same time period;
 determine one or more social factors between the first user and the second user;
 generate one or more suggestions for the first user based on the one or more social factors, the one or more suggestions comprising one or more context items that indicates the contemporaneous connection to the local area network by both the first client device and the second client device; and
 send, to the first client device, instructions for presenting one or more of the generated suggestions.

17. The system of claim 16, wherein determining the one or more social factors between the first user and the second user is based on social networking information associated with the first user and the second user.

18. The system of claim 16, wherein the qualified network-traffic pattern is qualified further based on a duration of the same time period during which the first client device and the second client device have been contemporaneously connected to the local area network.

19. The system of claim 16, wherein the qualified network-traffic pattern is qualified further based on social networking information associated with the first user and the second user.

20. The system of claim 16, wherein the processors are further operable when executing the instructions to:
 determine that the first client device and the second client device are located at a geographic location.

* * * * *